US010458391B2

(12) United States Patent
Zhang et al.

(10) Patent No.: US 10,458,391 B2
(45) Date of Patent: Oct. 29, 2019

(54) SINGLE-FRAME IMPELLER OF WIND TURBINE GENERATOR SET

(71) Applicant: Xiaoxin Zhang, Zhangjiakou (CN)

(72) Inventors: Xiaoxin Zhang, Zhangjiakou (CN); Chengxi Liang, Zhangjiakou (CN); Haoxia Dong, Zhangjiakou (CN)

(73) Assignee: Zhang, Xiaoxin, Zhangjiakou (CN)

( * ) Notice: Subject to any disclaimer, the term of this patent is extended or adjusted under 35 U.S.C. 154(b) by 434 days.

(21) Appl. No.: 15/293,124

(22) Filed: Oct. 13, 2016

(65) Prior Publication Data

US 2017/0030331 A1 Feb. 2, 2017

Related U.S. Application Data

(63) Continuation-in-part of application No. PCT/CN2015/097617, filed on Dec. 16, 2015, and a
(Continued)

(30) Foreign Application Priority Data

Oct. 21, 2014 (CN) .......................... 2014 1 0561011
May 16, 2015 (CN) .......................... 2015 1 0248335
Nov. 23, 2015 (CN) .......................... 2015 1 0818125

(51) Int. Cl.
*F03D 7/02* (2006.01)
*F03D 1/06* (2006.01)
(Continued)

(52) U.S. Cl.
CPC .......... *F03D 7/0224* (2013.01); *F03D 1/0625* (2013.01); *F03D 1/0658* (2013.01);
(Continued)

(58) Field of Classification Search
CPC ........ F03D 7/0224; F03D 80/82; F03D 80/88; F03D 1/0625; F03D 1/0658; F03D 7/024;
(Continued)

(56) References Cited

U.S. PATENT DOCUMENTS 2,291,062 A * 7/1942 Schneider ................ B63H 1/10
416/108
4,140,433 A * 2/1979 Eckel ........................ F03D 1/04
415/209.1
(Continued)

*Primary Examiner* — Jason D Shanske
*Assistant Examiner* — Eric J Zamora Alvarez
(74) *Attorney, Agent, or Firm* — Wayne & Ken, LLC; Tony Hom

(57) ABSTRACT

The present invention provides a single-frame impeller of a wind turbine generator set. The impeller includes blades and a blade adjusting device. The blade adjusting device comprises a blade adjusting chamber to which the blades are connected, a motor and an adjusting mechanism. The adjusting mechanism comprises transmission mechanism, adjusting frame, rotating arm and connecting rods. Transmission mechanism comprises swinging arm, a positioning shaft, a main drive arm and a push-pull rod. The adjusting frame is assembled onto blade adjusting chamber; the rotating arms are fixed on the blade shafts and the connecting rods, and the other end of each connecting rod is hinged with the adjusting frame; two ends of the positioning shaft are installed on the fixed seat; swinging arm is fixed at positioning shaft and is hinged with main drive arm, and the main drive arm is connected with the motor.

4 Claims, 14 Drawing Sheets

Related U.S. Application Data continuation-in-part of application No. PCT/CN2015/084917, filed on Jul. 23, 2015.

(51) Int. Cl.
  *F03D 80/80* (2016.01)
  *F16H 1/20* (2006.01)

(52) U.S. Cl.
  CPC ............ *F03D 80/82* (2016.05); *F03D 80/88* (2016.05); *F05B 2260/74* (2013.01); *F16H 1/203* (2013.01)

(58) Field of Classification Search
  CPC ............ F05B 2240/33; F05B 2260/74; F05B 2260/79; F05B 2260/403; F05B 2260/50; F05B 2260/76; F16H 1/203; Y02E 10/721; Y02E 10/723
  See application file for complete search history.

(56) References Cited

U.S. PATENT DOCUMENTS

| | | | | |
|---|---|---|---|---|
| 6,064,123 | A * | 5/2000 | Gislason | F03D 13/22 290/55 |
| 6,543,999 | B1 * | 4/2003 | Polen | F03D 3/067 416/116 |
| 6,604,907 | B1 * | 8/2003 | Lehnhoff | F03D 7/0224 416/156 |
| 7,323,792 | B2 * | 1/2008 | Sohn | F03D 1/04 290/55 |
| 8,573,933 | B2 * | 11/2013 | Presz, Jr. | F03D 1/04 415/182.1 |
| 2003/0223858 | A1 * | 12/2003 | O'Connor | F03D 1/04 415/4.1 |
| 2011/0135471 | A1 * | 6/2011 | Wangford | F03D 7/0224 416/17 |
| 2017/0022973 | A1 * | 1/2017 | Morimoto | F03D 1/0675 |

* cited by examiner

SINGLE-FRAME IMPELLER OF WIND TURBINE GENERATOR SET

CROSS-REFERENCE TO RELATED APPLICATIONS

This application is a continuation in part of International Patent Application No. PCT/CN2015/084917 with a filing date of Jul. 23 2015, designating the United States, now pending, and further claims priority to Chinese Patent Application No. 201410561011.7 with a filing date of Oct. 21, 2014; and this application is a continuation in part of International Patent Application No. PCT/CN2015/097617 with a filing date of Dec 16, 2015, designating the United States now pending, and further claims priority to Chinese Patent Application No. 201410561011.7 with a filing date of Oct. 21, 2014, No. 201510248335.X with a filing date of May 16, 2015 and No. 201510818125,X with a filing date of Nov. 23, 2015, The content of the aforementioned applications including any intervening amendments thereto, are incorporated herein by reference.

TECHNICAL FIELD

The present invention relates to the technical field of wind power generating equipment, in particular to a single-frame impeller of a wind turbine generator set.

BACKGROUND OF THE PRESENT INVENTION

A wind turbine generator set utilizes natural wind energy to drive blades and a generator main shaft to rotate so as to drive a motor rotor to rotate and to generate electric power, thereby having the characteristics of environmental friendliness and the like, and being widely used.

At present, a majority of wind turbine generator sets are in a three-blade drive form with a main shaft horizontally arranged; a fan of the structure increases rated output power by increasing a length of each blade, i.e. increasing a wind-swept area of each blade, so that while the power of the fan is increased an overall size and a height of the fan are also increased, a relatively high fan body and relatively long blades increase a vibration degree of the whole fan and a fracture probability of the blades, resulting in reduction of wind resistance and great increasing of design requirements for the structure, strength and materials of the whole fan; particularly the asynchronous adjustment for an angle of each blade increases the production, operation and daily maintenance cost; a smaller available range of a wind speed (when the wind speed is greater than 25 m/s, stopping is generally adopted to avoid the danger) leads to the waste of a great amount of wind power resources and increasing cost of the electric energy per unit kilowatt; and generally the fan has the problems of large investment on wind power equipment, long cost recovery period and less annual utilization hours. The civil fan is limited to the cost and structure, so that the angle of the blades is non-adjustable, and the overspeed "flying" failure of a wind wheel is common. In addition, the blades of the fan of the structure are limited to the materials and structure, so that the probability of bulging, fracturing and breaking of the blades struck by lightning is relatively high.

In addition, a horizontal-axis wind turbine with door-shaped blades and a retractable wind wheel disclosed in a Chinese patent with the patent number of ZL 201420077847.5 and a horizontal-axis wind turbine with paddle-shaped blades and a drum-type retractable wind wheel disclosed in a Chinese patent with the patent number of ZL 201420078001.3 solve partial problems for synchronizing the blades, reducing the size of the fan and the like; however, since the wind wheel structure is formed by two to three circular frames and a plurality of supporting rods, the weight of a whole fan head portion is not reduced; moreover, an adjusting mechanism of the blades adopt a way of forming a groove on the frame and pulling by virtue of a steel cable, so that the structure is complicated, and the corrosion resistance, the daily maintenance and the repairing are relatively difficult; and moreover, a frictional loss of the steel cable and the frame groove is relatively large, resulting in undesirable overall operation and unit power generation cost.

SUMMARY OF PRESENT INVENTION

An objective of the present invention is to provide a single-frame impeller of a wind turbine generator set, which overcomes the weaknesses in the prior art, and increases the utilization rate, power generation efficiency and unit power.

A technical solution of the present invention includes a generator with a main shaft horizontally arranged; and further includes a wind wheel frame, blades, a supporting base, oblique supporting rods and a blade adjusting device;

the blade adjusting device includes a blade adjusting chamber, a power unit and an adjusting mechanism; the blade adjusting chamber is of a horizontal cylinder, the rear end of the blade adjusting chamber is fixedly connected with a front portion of the supporting base, and the blade adjusting chamber and the supporting base are assembled at the front end of a generator main shaft; the supporting base and the wind wheel frame are connected with each other through the oblique supporting rods, the blade adjusting chamber is disposed at the center of the wind wheel frame, and the oblique supporting rods are uniformly distributed around the supporting base; the power unit and the adjusting mechanism are assembled inside the blade adjusting chamber;

the blades are fixedly installed on blade shafts, the outer side end of each blade shaft is assembled on the wind wheel frame through a bearing bush, the inner side end of each blade shaft stretches into a cylindrical side wall of the blade adjusting chamber, the blade shafts are matched with the cylindrical side wall of the blade adjusting chamber through the bearing bush and are limited by a shoulder or a chuck; the blades are uniformly distributed around the blade adjusting chamber; and the adjusting mechanism of the blade adjusting device is a gear combined-type adjusting mechanism or a connecting-rod-type combined adjusting mechanism, and the adjusting mechanism is connected with an output mechanism of the power unit and used for adjusting an angle of each blade.

According to a preferred solution, the gear combined-type adjusting mechanism is a multi-gear transmission-type adjusting mechanism and includes a main transmission gear, duplex gears and shaft-end bevel gears; the shaft-end bevel gears are fixed at the end portions of the blade shafts in the blade adjusting chamber; the main transmission gear is assembled at the middle portion of the blade adjusting chamber through a gear shaft, a plurality of duplex gears are assembled around the main transmission gear, and each duple gear is formed by a columnar gear and a bevel gear; the columnar gear portion of each duplex gear is engaged with the main transmission gear, and the bevel gar portion of each duplex gear is engaged with the shaft-end bevel gear;

and the main transmission gear is connected with a power output mechanism of the power unit.

According to a preferred solution, the connecting-rod-type combined adjusting mechanism includes a push-pull transmission mechanism, an adjusting frame, rotating arms and connecting rods; the push-pull transmission mechanism consists of a swinging arm, a positioning shaft, a main drive arm and a push-pull rod; a guide rail is arranged at the inner side of the cylindrical side wall of the blade adjusting chamber, and the adjusting frame is assembled onto the guide rail on the side wall of the blade adjusting chamber through a bearing or a roller; the rotating arms are vertically fixed on the end portions of the blade shafts disposed in the blade adjusting chamber, the other end of each rotating arm is hinged with the connecting rod, and the other end of each connecting rod is hinged with the adjusting frame; fixed seats are correspondingly arranged on the inner walls of a front end plate and a rear end plate of the blade adjusting chamber, the positioning shaft vertically penetrates through the middle portion of the adjusting frame, and two ends of the positioning shaft are installed on the fixed seat through a bearing and a bearing seat one end of the swinging arm is vertically fixed at the middle portion of the positioning shaft, the other end of the swinging arm is hinged with the main drive arm, and the main drive arm is connected with the output mechanism of the power unit of the blade adjusting device; and two ends of the push-pull rod are respectively hinged onto the middle portion of the swinging arm and the adjusting frame.

A further preferred solution of the blade adjusting mechanism is as follows: the adjusting mechanism includes a lead screw nut assembly connected with the output mechanism of the power unit, a plurality of slide rods parallel to the lead screw nut assembly, a substrate assembly for fixing the lead screw nut assembly and the slide rods, a slide device arranged at the front end of the lead screw nut assembly and sliding rectilinearly along the slide rods and a transmission assembly connected with the slide device and the blades.

According to one specific preferred solution, the lead screw nut assembly includes a first lead screw and a first nut; the slide device includes a front rack fixing disc and a rear rack fixing disc; the substrate assembly includes a first drive motor fixing disc, slide rod bearing seats, a first slide rod bearing, a front pressure plate and a rear pressure plate; the transmission assembly is a gear combined-type transmission assembly and includes gears and racks; the adjusting mechanism further includes a first cabin cylindrical wall; and the first cabin cylindrical wall is of a regular polygonal cylinder, the front pressure plate is connected onto the first drive motor fixing disc, the first cabin cylindrical wall is installed between the front pressure plate and the rear pressure plate, a plurality of uniformly-distributed holes for assembling the blade shafts are arranged on the first cabin cylindrical wall, three slide rod bearing seats are uniformly distributed on the rear pressure plate, three uniformly-distributed slide rods penetrate through the slide rod bearing seats through a first slide rod bearing and are fixed on the front rack fixing disc and the rear rack fixing disc, a plurality of racks are uniformly fixed between the front rack fixing disc and the rear rack fixing disc, the blade shafts are installed on the first cabin cylindrical wall through bearings, the gears are fixed on the end portions of the blade shafts at the inner side of the first cabin cylindrical wall and are engaged with the racks, the first nut is fixed at the center of the front rack fixing disc, and the first lead screw and the first nut are matched with each other and connected with the output mechanism of the power unit.

Further, the first cabin cylindrical wall is of a regular dodecagonal cylinder, twelve uniformly-distributed holes for assembling the blade shafts are arranged on the first cabin cylindrical wall, and the quantity of the adjustable blades of the blade adjusting mechanism is correspondingly twelve.

According to a further another specific preferred solution, the lead screw nut assembly includes a second lead screw and a second nut, the slide device includes a second slide rod bearing and a slide disc; the substrate assembly includes a second drive motor fixing disc, a front bearing seat, a rear bearing seat, a supporting disc and supporting rods; the transmission assembly is a connecting-rod-type combined transmission assembly and includes connecting rods, connecting rod connecting pins, rotating arm connecting pins, rotating arms, coupling shafts, coupling bearing seats, a second bearing and blade shaft sleeves;

the supporting rods are fixed on the second drive motor fixing disc, the supporting disc is installed on the supporting rods, the slide rods are uniformly installed on the supporting disc, the slide disc is installed on the slide rods through the second slide rod bearings, the connecting rods are installed on the slide disc through the connecting rod connecting pins, one end of each rotating arm is connected with the connecting rod through the rotating arm connecting pin, the other end of the rotating arm is fixedly connected with the coupling shaft, the coupling shafts are installed on the coupling bearing seats through the second bearing, the blade shaft sleeves are installed on the coupling shafts through screws, the second nut is installed at the center of the slide disc, the front bearing seat is installed on a front end cover, the rear bearing seat is installed on the supporting disc, and the second lead screw penetrates through the supporting disc to be matched with the second nut and is connected with the output mechanism of the power unit through a coupler.

Further, the adjusting mechanism is coated with a shell, the shell includes a front end cover arranged at the front end of the coupling bearing seat, a second cabin cylindrical wall for installing the coupling bearing seat and the front end cover and a machine base arranged at the rear end of the second cabin cylindrical wall; and the machine base and the second cabin cylindrical wall are fixed on the second drive motor fixing disc.

Further, the second cabin cylindrical wall is of a circular cylinder.

In order to enable the wind wheel structure of the present invention to be firmer, a spoke-type supporting rod is fixedly connected between the wind wheel frame and the blade adjusting chamber.

Further, the blades are improved as follows: the blades are of a hollow structure, the cross section of each blade is in an arc shape, and a supporting ribbed plate is arranged inside each blade; and the surface of each blade is of a longitudinal spiral curved surface.

Further, a conical guide cover is assembled at the front end of the blade adjusting chamber.

Further, the power unit of the blade adjusting device adopts an electric motor.

The present invention has the following beneficial effects: the present invention adopts a frame circular wind wheel, and a plurality of blades capable of rotating around a shaft are assembled in the frame. By changing the quantity, the shape, the connection way and the like of the blades, the connection strength of the blades is improved. By increasing the adjustable angle of the blades, the application both in a low wind speed region and a high wind speed region can be simultaneously satisfied, and the wind energy utilization efficiency of the fan is increased, the output power of the whole fan is increased, thereby decreasing the cost of unit power generation power, and reducing the size, the height and the weight of the fan; the wind wheel frame is made of a metal material, so that the blades can be prevented from being struck by lightning; and the problems in the prior art that the output power of a three-blade horizontal shaft wind turbine generator set is difficult to be further increased, the available wind speed range of the fan is relatively small, the blades are easy to damage by the lightning stroke and the like are solved.

Compared with a telescopic wind-wheel-type fan, according to the technical features of the present invention the weight and the size of a machine head of the fan and the length of the main shaft are greatly reduced, the blade adjusting device is improved, and the adjusting mechanism is arranged in the adjusting chamber, so that the structure is reasonable, the loss is relatively small, and the failure rate is decreased.

Further, the blade adjusting mechanism of the present invention adopts the lead screw nut mechanism, the gear-rack transmission mechanism or the connecting-rod-type transmission mechanism, and the blade adjusting way is changed, so that the blade angle is synchronously adjusted, the angle adjustment of the blades is easy to control and is stable, the application both in the low wind speed region and in the high wind speed region can be simultaneously satisfied, the wind energy utilization efficiency of the fan is increased, and the output power of the whole fan is increased. The connecting-rod-type adjusting mechanism has an optimum adjusting performance, so that the adjustable angle of the blades are more flexible to change.

The present invention is further described below with reference to drawings and embodiments.

DETAILED DESCRIPTION OF PREFERRED EMBODIMENTS

Figure 1:
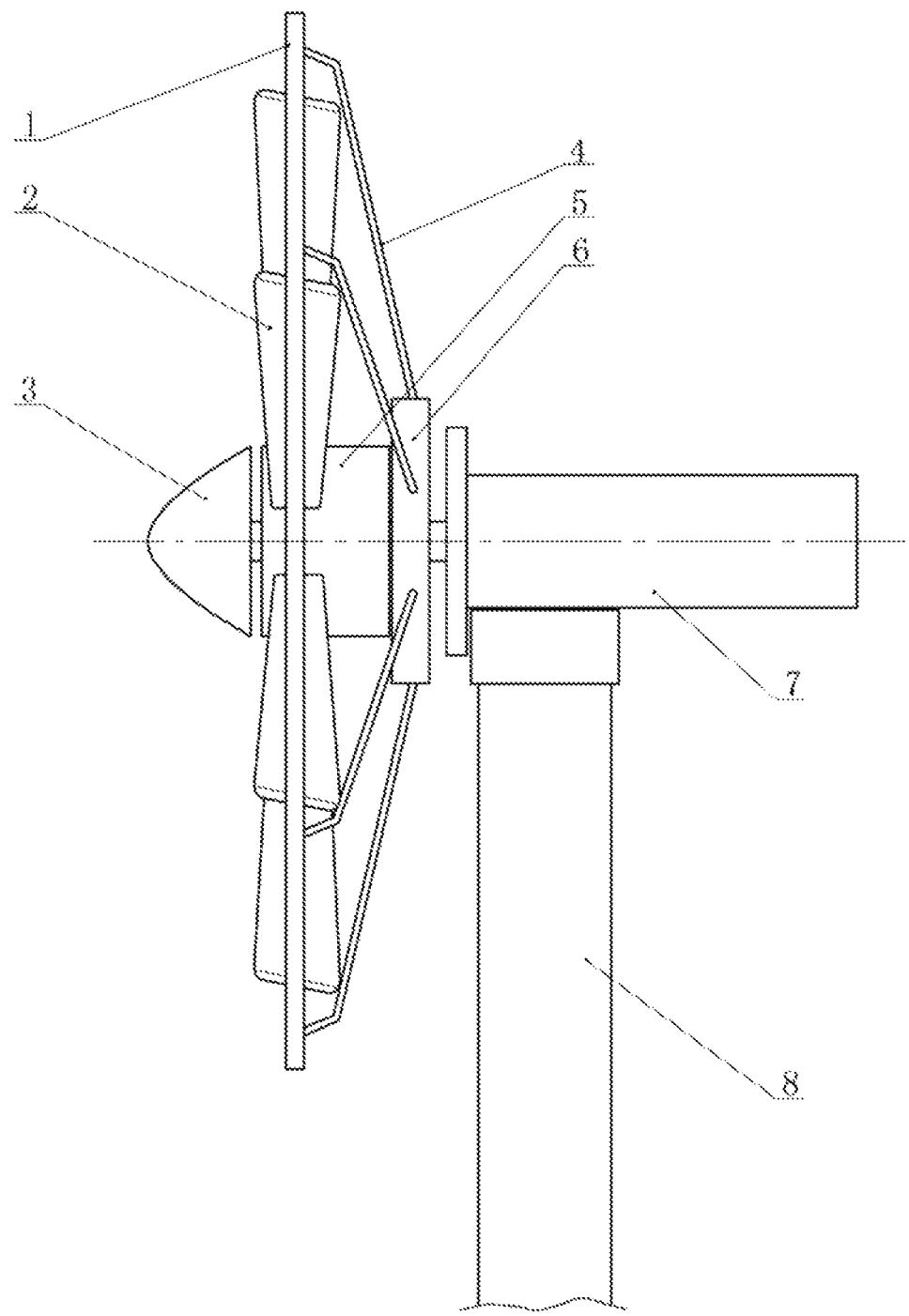
FIG. 1 is a structural schematic diagram of embodiment 1 of the present invention.
Figure 2:
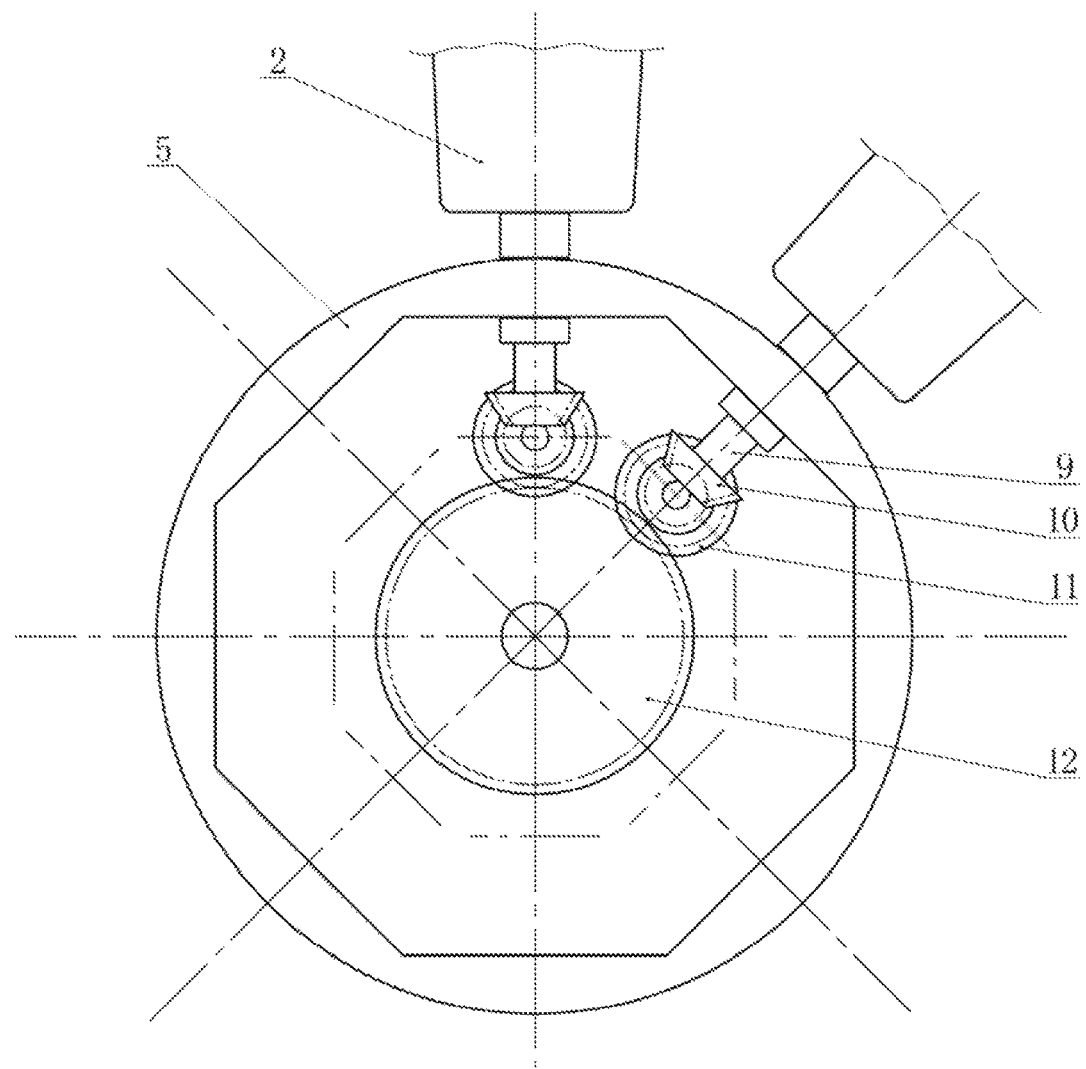
FIG. 2 is a structural schematic diagram of a gear-type blade adjusting mechanism provided in embodiment 1 of the present invention.
Figure 3:
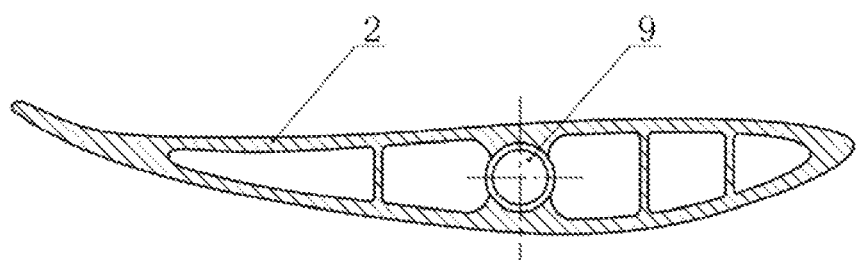
FIG. 3 is a schematic diagram of a cross section of a blade of the present invention.
Figure 4:
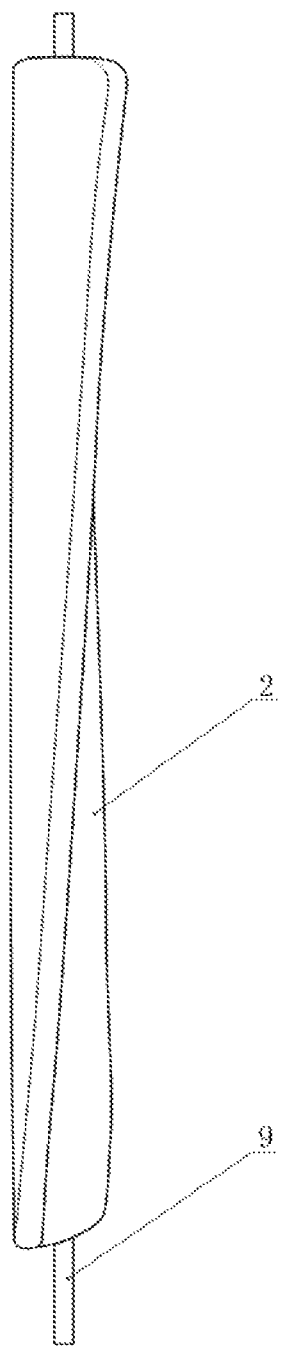
FIG. 4 is a schematic diagram of an appearance of a blade of the present invention.

In the drawings: 1. wind wheel frame, 2. blade, 3. guide cover, 4. oblique supporting rod, 5. blade adjusting chamber, 6. supporting base, 7. generator, 8 pole tower, 9. blade shaft, 10. shaft-end bevel gear, 11. duplex gear, 12. main transmission gear, 13. spoke-type supporting rod, 14. fixed seat, 15. slide block, 16. swinging arm, 17. main drive arm, 18. push-pull rod, 19. adjusting frame, 20. rotating arm, 21. connecting rod, 22. power unit;

31. front pressure plate, 32. first drive motor fixing disc, 33. first lead screw, 34. front rack fixing disc, 35. first nut, 36. first cabin cylindrical wall, 38, rear pressure plate, 39. slide rod bearing seat, 40. first slide rod bearing, 41. slide rod, 42. rear rack fixing disc, 43. first bearing, 44. gear, 45. rack; and

51. rear bearing seat, 52. second lead screw, 53. coupler, 54. front bearing seat, 55. second nut, 56. second slide rod bearing, 57. slide disc, 58. connecting rod, 59. connecting rod connecting pin. 60. rotating arm connecting pin, 61. rotating arm, 62, coupling shaft, 63. slide rod, 64. supporting disc, 65. supporting rod, 66. second drive motor fixing disc, 68. front end cover, 69. blade shaft sleeve, 70. second bearing, 71, coupling bearing seat, 72. second cabin cylindrical wall, 73. machine base.

Embodiment 1

As shown in FIG. 1 to FIG. 4 a technical solution of the present invention includes a generator 7 with a main shaft horizontally arranged, a wind wheel frame 1, blades 2, a supporting base 6, oblique supporting rods 4 and a blade adjusting device; the generator 7 is assembled on the top of a pole tower 8;

the blade adjusting device includes a blade adjusting chamber 5, a power unit 22 and an adjusting mechanism: the blade adjusting chamber 5 is of a horizontal cylinder, the rear end of the blade adjusting chamber 5 is fixedly connected to a front portion of the supporting base 6, the blade adjusting chamber 5 is integrated with the supporting base 6 and it is assembled at the front end of a generator main shaft and rotate along with the main shaft; the supporting base 6 and the wind wheel frame 1 are connected through the oblique supporting rods 4, so that the blade adjusting chamber 5 is disposed at the center of the wind wheel frame 1, and the supporting base 6 is disposed behind a plane of the wind wheel frame; the oblique supporting rods 4 are uniformly distributed around the supporting base 6, and the power unit 22 and the adjusting mechanism are assembled inside the blade adjusting chamber 5; a front end plate of the blade adjusting chamber 5 is provided with a conical guide cover 3; and the wind wheel frame 1 is made of a metal material, and a frame body naturally forms an annular lightning arrester, so that when in thunderstorm days, the lightning can be prevented from directly striking the blades, resulting in fracturing, bulging and breaking damage of the blades, thereby greatly decreasing the failure rate.

The blades are fixedly installed on blade shafts 9; each blade 2 is of a hollow structure, the cross section of each blade 2 is in an arc shape, and a supporting ribbed plate is arranged inside each blade 2; the surface of each blade 2 is of a spiral curved surface twisted along a longitudinal direction (axial direction of each blade); the outer side end of each blade shaft 9 is assembled onto the wind wheel frame 1 through a bearing bush, the inner side end of each blade shaft 9 stretches into a cylindrical side wall of the blade adjusting chamber 5, is matched with the cylindrical side wall of the blade adjusting chamber 5 through the bearing bush and is limited by a shoulder or a chuck to prevent the axial play of the blades; the blades 2 are uniformly distributed around the blade adjusting chamber 5;

the adjusting mechanism of the blade adjusting device is a gear combined-type adjusting mechanism or a connecting-rod-type combined adjusting mechanism; the present embodiment adopts the gear combined-type adjusting mechanism, and the power unit 22 for adjusting and controlling an angle of each blade 2 adopts an electric motor; the gear combined-type adjusting mechanism includes a main transmission gear 12, duplex gears 11 and shaft-end bevel gears 10; the shaft-end bevel gears 10 are fixed at the ends of the blade shafts 9 disposed inside the blade adjusting chamber 5; the main transmission gear 12 is assembled to the middle portion of the blade adjusting chamber 5 through a gear shaft, a plurality of duplex gears 11 are assembled around the main transmission gear 12, and each duplex gear 11 is formed by a columnar gear and a bevel gear; the columnar gear portion of each duplex gear 11 is engaged with the main transmission gear 12, and the bevel gear portion of each duplex gear 11 is engaged with the shaft-end bevel gear 10; a gear shaft of the main transmission gear 12 is connected with a power output shaft of the electric motor through a reducer; the power of the electric motor is output through the main transmission gear 12 to drive each duplex gear 11 and each shaft-end bevel gear 10 to rotate, to adjust and control the rotation of the blades 2 and to change a windward angle; and when the wind is relatively heavy, the windward angle of the blades 2 can be minimized to control a rotation speed of a wind wheel, thereby guaranteeing the maximum safety-load operation of the fan.

According to the size and the weight of the fan, a middle-sized fan can utilize a plurality of electric motors to control the angle of the blades 2, and the output shaft of each electric motor is connected and matched with the main transmission gear 12 by changing a transmission ratio through each gear and outputs the power.

Embodiment 2

Figure 5:
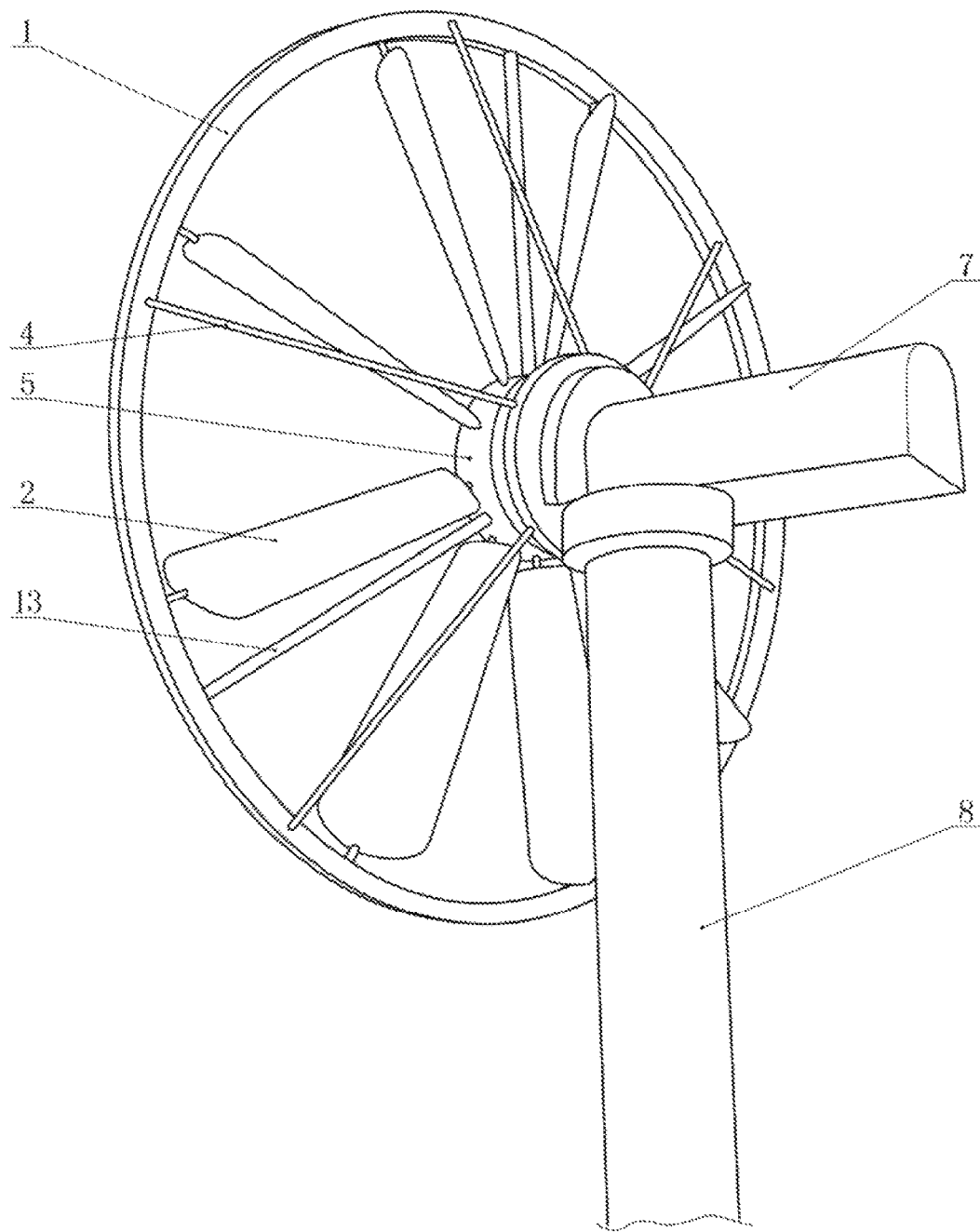
FIG. 5 is a structural schematic diagram of embodiment 2 of the present invention.
Figure 6:
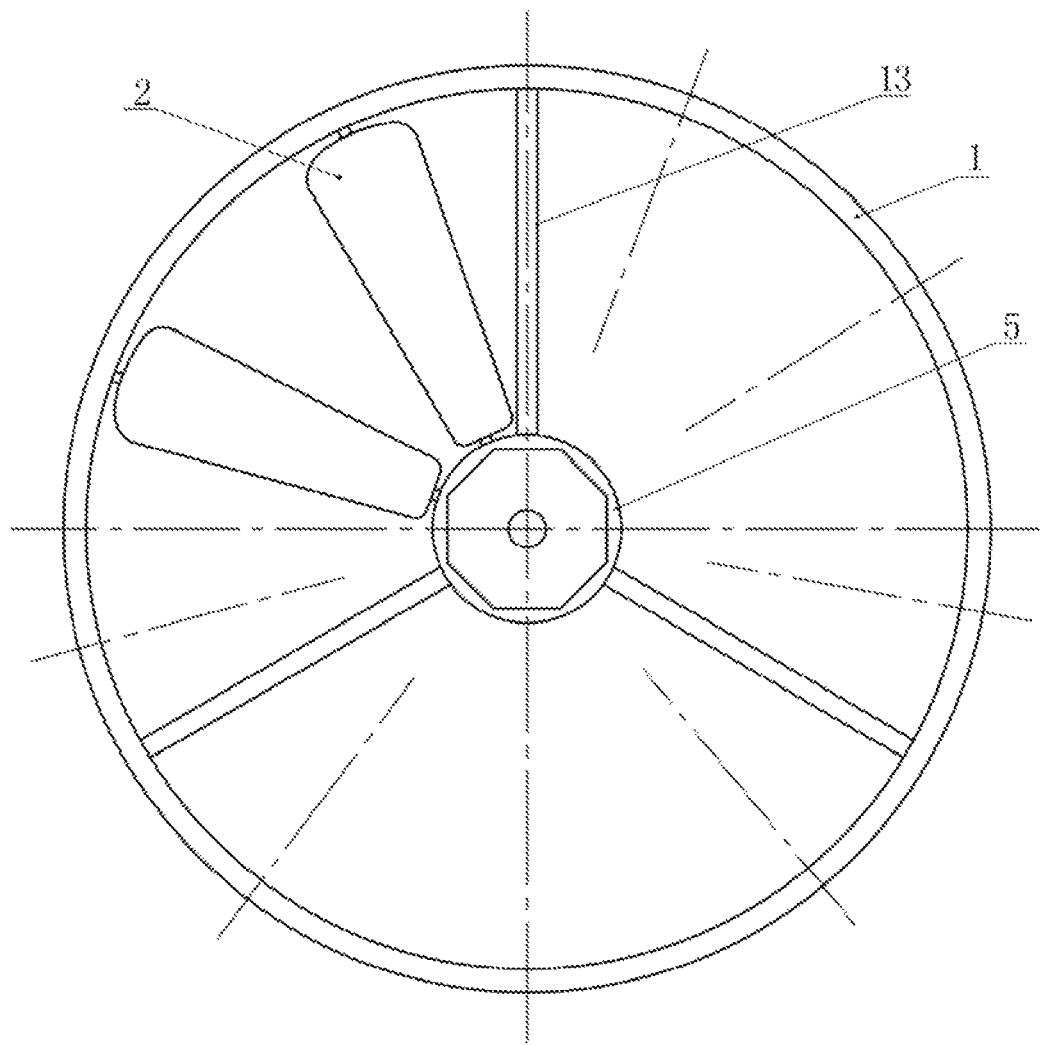
FIG. 6 is a schematic diagram of a connection between a wind wheel frame and a blade adjusting chamber provided in embodiment 2 of the present invention.
Figure 7:
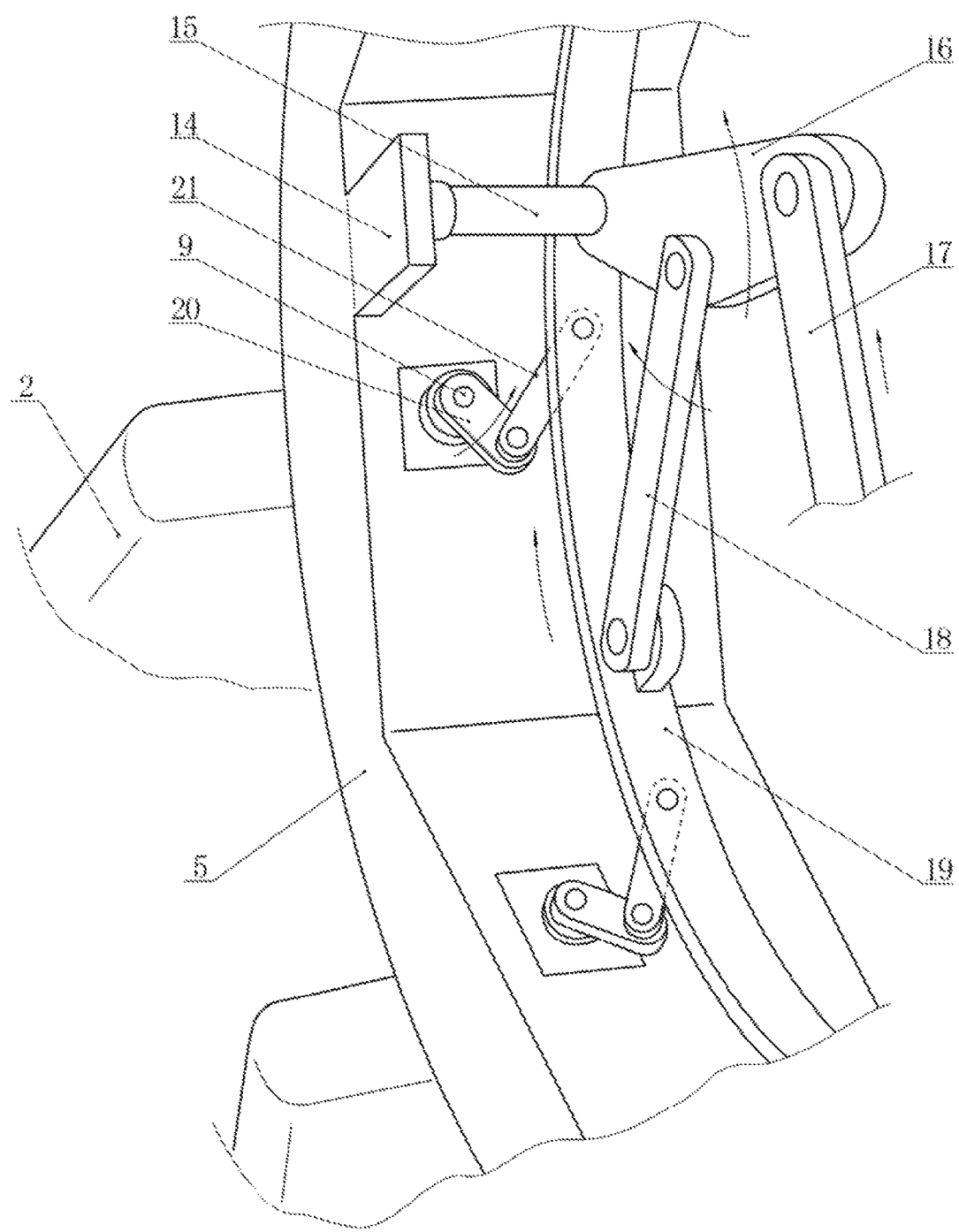
FIG. 7 is a structural schematic diagram of a connecting-rod-type blade adjusting mechanism provided in embodiment 2 of the present invention.
Figure 8:
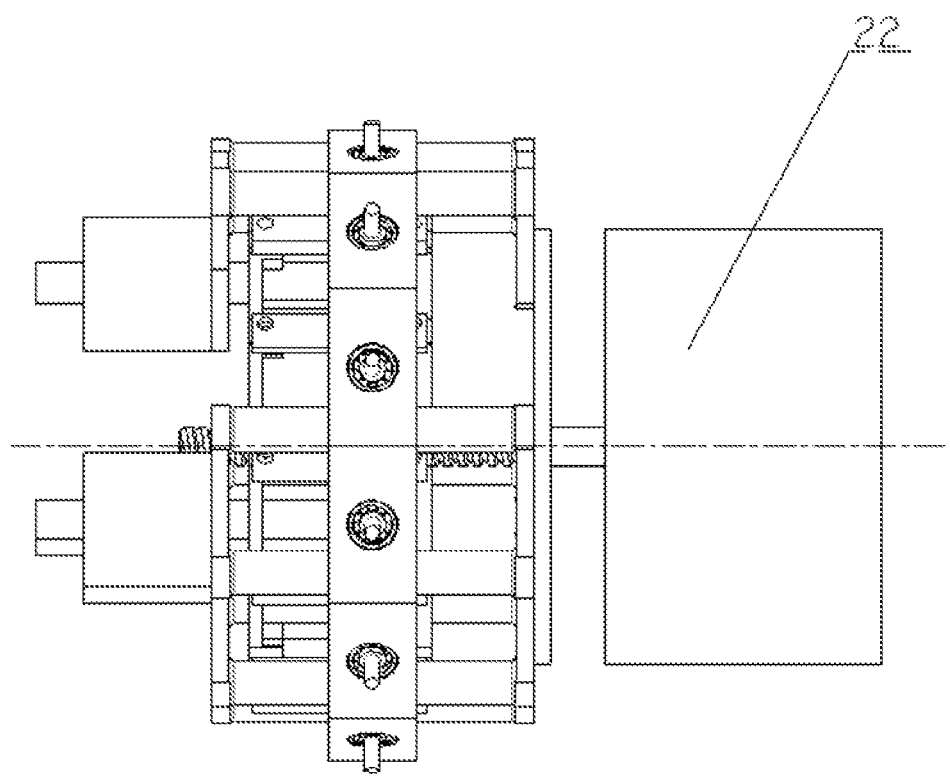
FIG. 8 is a structural schematic diagram of a blade adjusting mechanism provided in embodiment 3 of the present invention.
Figure 9:
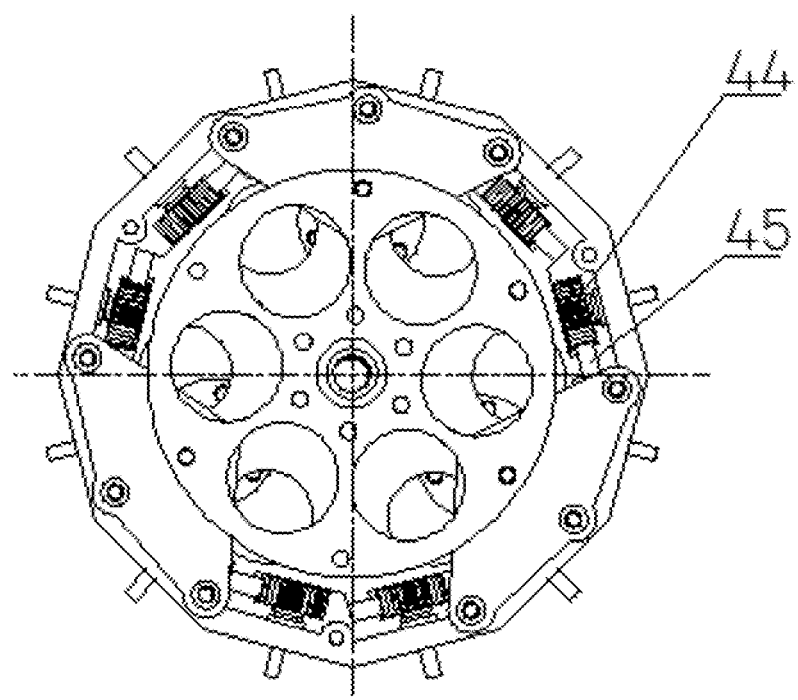
FIG. 9 is a front view of a blade adjusting mechanism provided in embodiment 3 of the present invention.
Figure 10:
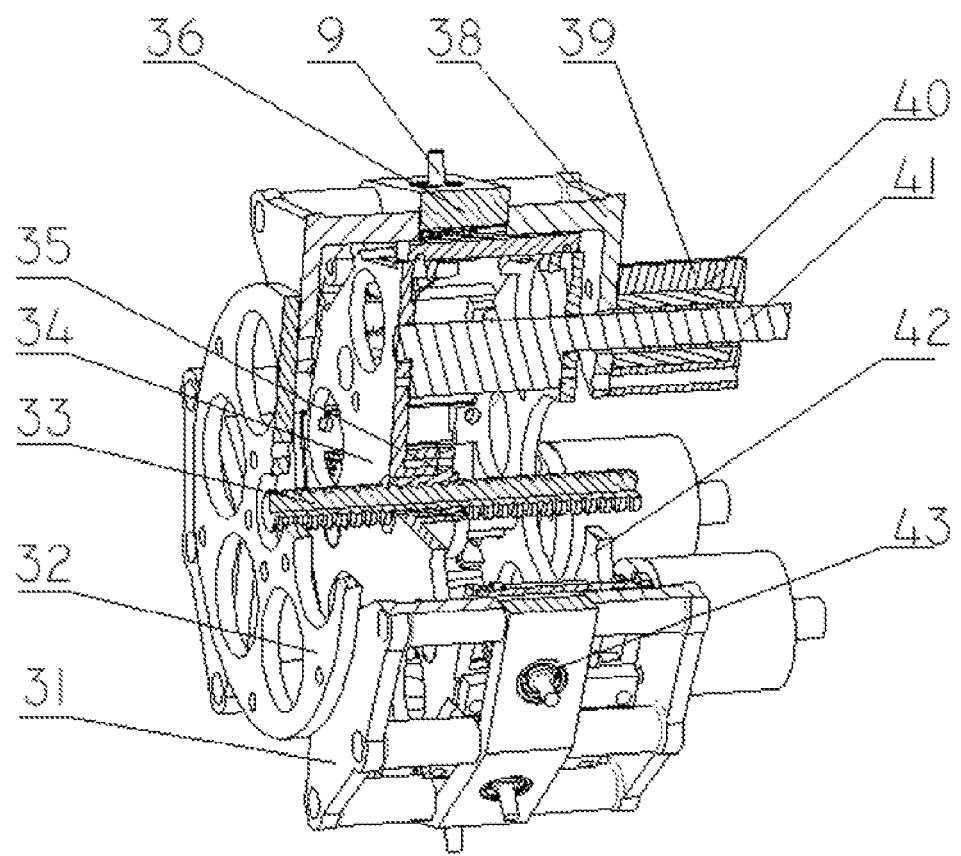
FIG. 10 is an internal structural diagram of a straight-rack-type blade adjusting mechanism provided in embodiment 3 of the present invention.
Figure 11:
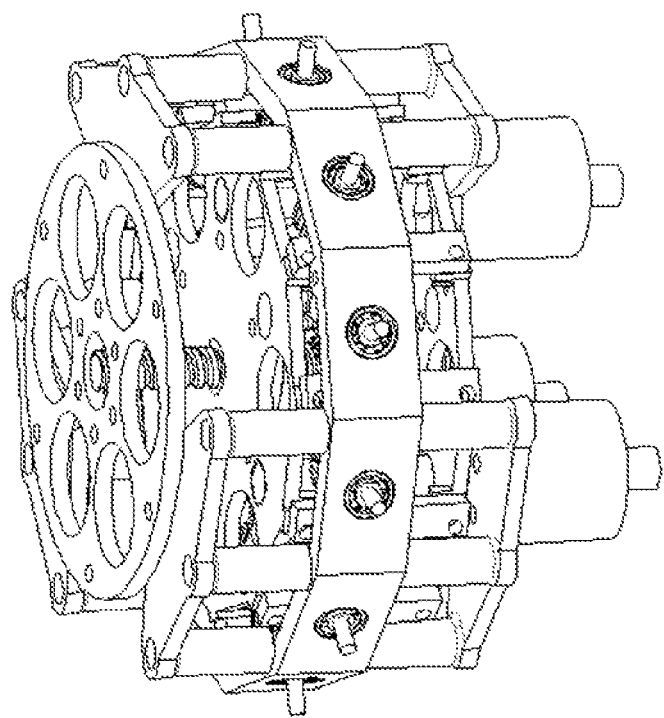
FIG. 11 is a perspective view of a straight-rack-type blade adjusting mechanism provided in embodiment 3 of the present invention.

The present embodiment takes a large-sized wind turbine generator set with relatively high output power as an example; as shown in FIG. 5 to FIG. 7, the differences between the present embodiment and the embodiment 1 are since the size and the weight of the fan are relatively large, three spoke-type supporting rods 13 are fixedly connected between the blade adjusting chamber 5 and the wind wheel frame 1, the spoke-type supporting rods 13 are uniformly distributed in a shape like a Chinese character "PIN", thereby improving the strength and the wind resistance of the wind wheel; the adjusting mechanism of the blade adjusting device adopts the connecting-rod-type combined adjusting mechanism, the connecting-rod-type combined adjusting mechanism includes a push-pull transmission mechanism, an adjusting frame 19, rotating arms 20 and connecting rods 21; the push-pull transmission mechanism consists of a swinging arm 16, a positioning shaft 15, a main drive arm 17 and a push-pull rod 18; a circle of annular guide rail is arranged at the inner side of the cylindrical side wall of the blade adjusting chamber 5, the adjusting frame 19 is assembled onto the guide rail on the side wall of the blade adjusting chamber 5 through a roller or a bearing, and the adjusting frame 19 can rotate in the blade adjusting chamber 5 along the guide rail; the rotating arms 20 are vertically fixed at the ends of the blade shafts 9 disposed in the blade adjusting chamber, and the other ends of the rotating arms 20 are hinged with the connecting rods 21 (may also be connected by adopting a universal joint structure); the other ends of the connecting rods 21 are hinged with the adjusting frame 19; fixed seats 14 are correspondingly and respectively arranged on the inner walls of a front end plate and a rear end plate of the blade adjusting chamber 5, the positioning shaft 15 vertically penetrates through the middle portion of the adjusting frame 19, and two ends of the positioning shaft 15 are installed on the fixed seats 14 through a bearing and a bearing seat; one end of the swinging arm 16 is vertically fixed at the middle portion of the positioning shaft 15 to form a T-shaped structure, the other end of the swinging arm 16 is hinged with the main drive arm 17, the main drive arm 17 is connected with the power unit 22 of the blade adjusting device through a hydraulic device, i.e. the main drive arm 17 is connected with a hydraulic cylinder piston rod of the hydraulic device, and the electric motors (power unit 22) are connected through an oil pump and control a hydraulic cylinder to work; and two ends of the push-pull rod 18 are respectively hinged onto the middle portion of the swinging arm 16 and the adjusting frame 19.

The electric motors drive the main drive arm 17 to move through the hydraulic device so as to push (or pull) the swinging arm 16 to swing around the positioning shaft 15, the swinging arm 16 drives the adjusting frame 19 to rotate along the guide rail through the push-pull rod 18, and the adjusting frame 19 drags the connecting rods 21 to drive the rotating arms 20 to swing so as to drive each blade shaft 9 to rotate, thereby changing the windward angle of the blades 2.

According to the power of the fan and the size and the weight of the blade mechanism, a plurality of groups of push-pull transmission mechanisms can be arranged and are respectively driven by a plurality of electric motors to simultaneously rotate so as to drive the blades 2 to rotate.

Other structures of the present embodiment are identical to that of the embodiment 1.

The present invention further optimizes and improves the blade adjusting mechanism; and the adjusting mechanism includes a lead screw nut assembly connected with an output mechanism of the power unit 22, a plurality of slide rods 41, 63 parallel to the lead screw nut assembly, a substrate assembly for fixing the lead screw nut assembly and the slide rods 41, 63, a slide device arranged at the front end of the lead screw nut assembly and sliding rectilinearly along the slide rods 41, 63 and a transmission assembly connected with the slide device and the blades. The specific embodiment is described below.

Embodiment 3

The present embodiment enumerates another mode of execution of the blade adjusting mechanism, and as shown in FIG. 8-11, the lead screw nut assembly includes a first lead screw 33 and a first nut 35; the slide device includes a front rack fixing disc 34 and a rear rack fixing disc 42; the substrate assembly includes a first drive motor fixing disc 32, slide rod bearing seats 39, first slide rod bearings 40, a front pressure plate 31 and a rear pressure plate 38; the transmission assembly is a gear combined-type transmission assembly and includes gears 44 and racks 45; and the adjusting mechanism further includes a first cabin cylindrical wall 36.

The first cabin cylindrical wall 36 is of a regular polygonal cylinder, the front pressure plate 31 is connected onto the first drive motor fixing disc 32, the first cabin cylindrical 36 is installed between the front pressure plate 31 and the rear pressure plate 38, a plurality of uniformly-distributed holes for assembling the blade shafts 9 are arranged on the first cabin cylindrical wall 36, three slide rod bearing seats 39 are uniformly distributed on the rear pressure plate 38, three uniformly-distributed slide rods 41 penetrate through the slide rod bearing seats 39 through the first slide rod bearings 40 and are fixed on the front rack fixing disc 34 and the rear rack fixing disc 42, a plurality of racks 45 are uniformly fixed between the front rack fixing disc 34 and the rear rack fixing disc 42, the blade shafts 9 are installed on the first cabin cylindrical wall 36 through the bearings, the gears 44 are fixed on the end portions of the blade shafts 9 at the inner side of the first cabin cylindrical wall 36 and are engaged with the racks 45, the first nut 35 is fixed at the center of the front rack fixing disc 34, and the first lead screw 33 and the first nut 35 are matched with each other and connected with the output mechanism of the power unit 22.

In the above solution, the first cabin cylindrical wall 36 is preferably of a regular dodecagonal cylinder, twelve uniformly-distributed holes for assembling the blade shafts 9 are arranged on the first cabin cylindrical wall 36, and the quantity of the adjustable blades 2 of the blade adjusting mechanism is correspondingly twelve.

The output power of the electric motors drives the first lead screw 33 to rotate to drive the front rack fixing disc 34, the rear rack fixing disc 42, each rack 45 and the slide rod 41 to move in the horizontal direction so as to realize the rotation of each gear 44 and each blade shaft 9, thereby adjusting and controlling the rotation of the blades 2, and changing the windward angle; and when the wind is relatively heavy, the windward angle of the blades 2 can be minimized, thereby reducing the wind resistance, and guaranteeing the full-load operation of the fan.

According to the size and the weight of the fan, a middle-sized fan can utilize a plurality of electric motors to control the angle of the blades 2, and the output shaft of each electric motor is respectively connected and matched with the first lead screw 33 and transfers the power.

Embodiment 4

Figure 12:
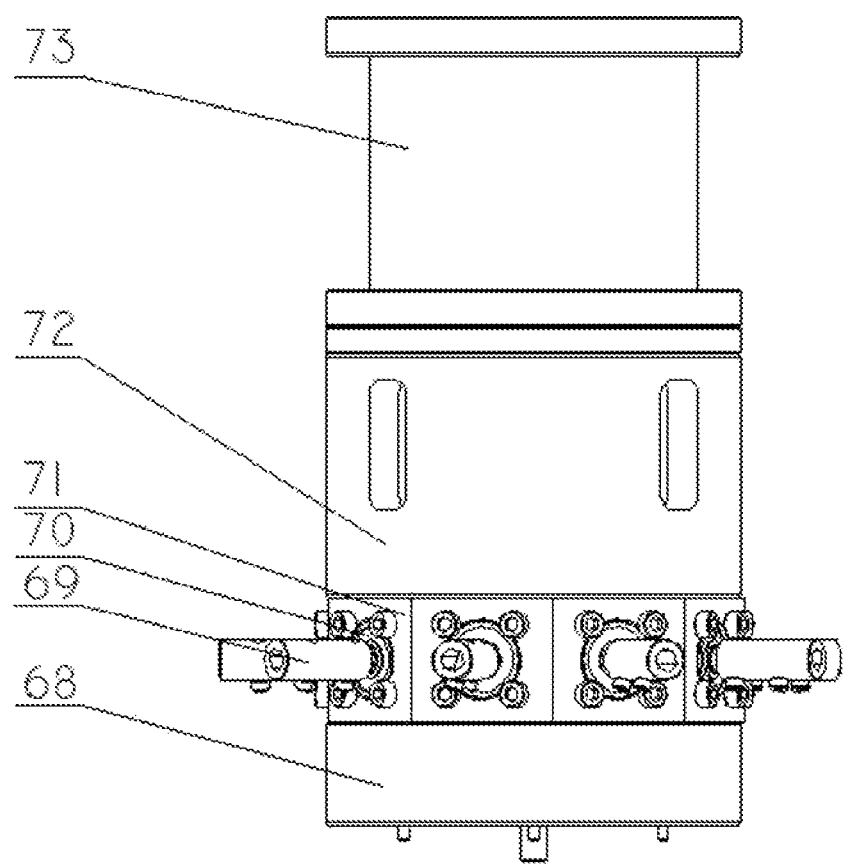
FIG. 12 is a structural schematic diagram of a blade adjusting mechanism provided in embodiment 4 of the present invention.
Figure 13:
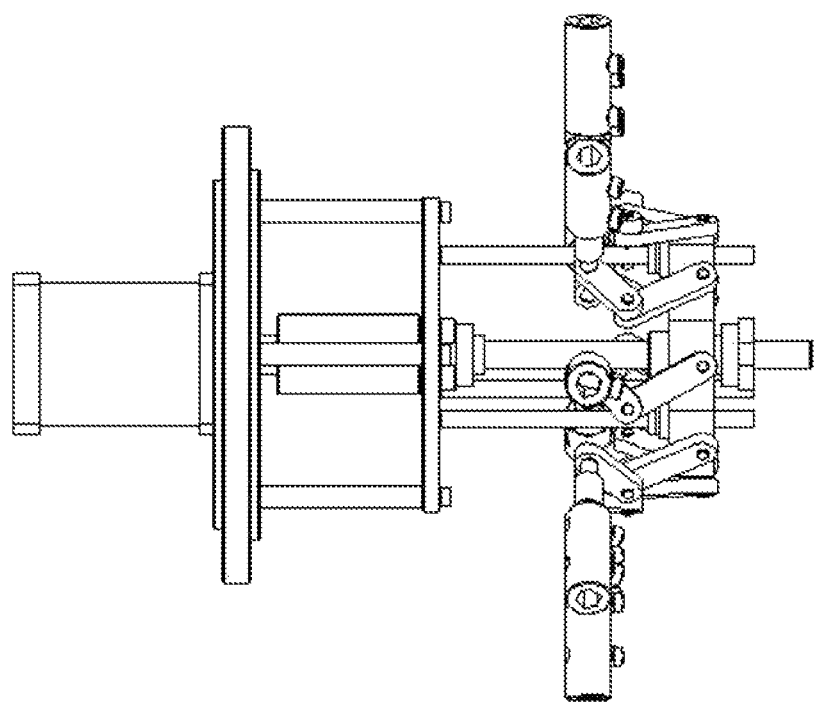
FIG. 13 is a schematic diagram of a connecting-rod-type blade adjusting mechanism provided in embodiment 4 of the present invention.
Figure 14:
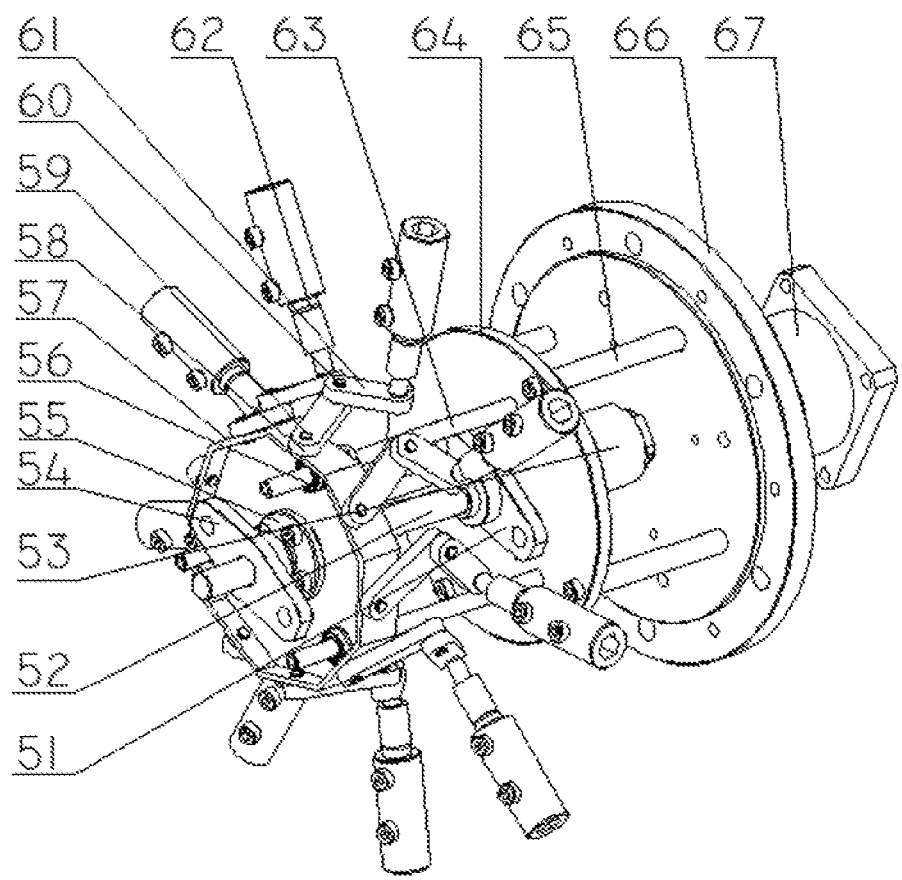
FIG. 14 is a perspective view of a connecting-rod-type blade adjusting mechanism provided in embodiment 4 of the present invention.

The present embodiment enumerates another mode of execution of the blade adjusting mechanism; and as shown in FIG. 12-14, the lead screw nut assembly includes a second lead screw 52 and a second nut 55; the slide device includes second slide rod bearings 56 and slide discs 57; the substrate assembly includes a second drive motor fixing disc 60, a front bearing seat 54, a rear bearing seat 51, a supporting disc 64 and supporting rods 65; the transmission assembly is a connecting-rod-type transmission assembly and includes connecting rods 58, connecting rod connecting pins 59, rotating arm connecting pins 60, rotating arms 61, coupling shafts 62, coupling bearing seats 71, second bearings 70 and blade shaft sleeves 69; and the adjusting mechanism is coated with a shell, and the shell includes a front end cover 68, a second cabin cylindrical wall 72 and a machine base 73.

The second cabin cylindrical wall 72 is of a circular cylinder, the supporting rods 65 are fixed on the second drive motor fixing disc 66, the supporting disc 64 is installed on the supporting rods 65, the slide rods 63 are uniformly installed on the supporting disc 64, the slide discs 57 are installed on the slide rods 63 through the second slide rod bearings 52, the connecting rods 58 are installed on the slide discs 57 through the connecting rod connecting pins 59, one end of each rotating arm 61 is connected with the connecting rods 58 through the rotating arm connecting pins 60, the other end of each rotating arm 61 is fixedly connected with the coupling shafts 62, the coupling shafts 62 are installed on the coupling bearing seats 71 through the second bearings 70, the blade shaft sleeves 69 are installed on the coupling shafts 62 through screws, the second nut 55 is installed at the center of the slide disc 57, the front bearing seat 54 and the bearing are installed on the front end cover 68, the rear bearing seat 51 and the bearing are installed on the supporting disc 64, the second lead screw 52 penetrates through the supporting disc 64 to be matched with the second nut 55 and is connected with the output mechanism of the power unit 22 through a coupler 53, the machine base 73 and the second cabin cylindrical wall 72 are fixed on the second drive motor fixing disc 66 through bolts, and the coupling bearing seats 71 and the front end cover 68 are installed on the second cabin cylindrical wall 72 through bolts.

The output power of the electric motors drives the second lead screw 52 to rotate to drive the slide discs 57 to move in the horizontal direction thereby realizing the movement of the connecting rods 58 and the rotating arms 61, adjusting and controlling the rotation of the blades 2, and changing the windward angle; and when the wind is relatively heavy, the windward angle of the blades 2 is minimized, thereby reducing the wind resistance, and guaranteeing the full-load operation of the fan.

According to the size and the weight of the fan, a middle-sized fan can utilize a plurality of electric motors to control the angle of the blades 2, and the output shaft of each electric motor is respectively connected and matched with the second lead screw 52 and transfers the power.

It should be pointed out that the detail description of the technical solution of the present invention with reference to preferred embodiments is illustrative but not restrictive. People having ordinary skill in the art can make amendments to the present disclosed technical solutions or equivalently replace partial technical features on the basis of the present specification. However, those amendments or replacements without departing from the spirits of the disclosed solution should fall into the scope of the present disclosure.

We claim:

1. A single-frame impeller of a wind turbine generator set, the single-frame impeller comprising:
  a generator with a main shaft horizontally arranged;
  a wind wheel frame;
  blades;
  a supporting base;
  oblique supporting rods; and
  a blade adjusting device, wherein: the blade adjusting device comprises a blade adjusting chamber (5), a motor (22) and an adjusting mechanism; the blade adjusting chamber (5) is of a horizontal cylinder, a rear end of the blade adjusting chamber (5) is fixedly connected with a front portion of the supporting base (6), and the blade adjusting chamber (5) and the supporting base (6) are assembled at a front end of a generator main shaft; the supporting base (6) and the wind wheel frame (1) are connected with each other through the oblique supporting rods (4), the blade adjusting chamber (5) is disposed at a center of the wind wheel frame (1), and the oblique supporting rods (4) are uniformly distributed around the supporting base (6); the motor (22) and the adjusting mechanism are assembled inside the blade adjusting chamber (5), and the adjusting mechanism is connected to the motor and is powered by the motor; the blades (2) are fixedly installed on blade shafts (9) of the blades (2), an outer side end of each blade shaft (9) is assembled on the wind wheel frame (1), an inner side end of each blade shaft (9) stretches into a cylindrical side wall of the blade adjusting chamber (5), the blade shafts (9) are matched with the cylindrical side wall of the blade adjusting chamber (5); the blades (2) are uniformly distributed around the blade adjusting chamber; and the adjusting mechanism for adjusting an angle of each blade comprises a push-pull transmission mechanism, an adjusting frame (19), rotating arms (20) and connecting rods (21); the push-pull transmission mechanism comprises a swinging arm (16), a positioning shaft (15), a main drive arm (17) and a push-pull rod (18); the adjusting frame (19) is assembled onto the side wall of the blade adjusting chamber; the rotating arms (20) are vertically fixed on end portions of the blade shafts (9) disposed in the blade adjusting chamber, a second end of each rotating arm (20) is hinged with a respective connecting rod (21), and a second end of each connecting rod (21) is hinged with the adjusting frame (19); fixed seats (14) are correspondingly arranged on inner walls of a front end plate and a rear end plate of the blade adjusting chamber (5), the positioning shaft (15) vertically penetrates through a middle portion of the adjusting frame (19), and ends of the positioning shaft (15) are installed on the respective fixed seats (14); one end of the swinging arm (16) is vertically fixed at a middle portion of the positioning shaft (15), the other end of the swinging arm (16) is hinged with the main drive arm (17), and the main drive arm (17) is connected with the motor; and two ends of the push-pull rod (18) are respectively hinged onto a middle portion of the swinging arm (16) and the adjusting frame (19).

2. The single-frame impeller of a wind turbine generator set according to claim 1, wherein a spoke-type supporting rod (13) is fixedly connected between the wind wheel frame (1) and the blade adjusting chamber (5).

3. The single-frame impeller of a wind turbine generator set according to claim 1, wherein the blades (2) are of a hollow structure, a cross section of each blade (2) is in an arc shape, and a supporting ribbed plate is arranged inside each blade; a surface of each blade (2) is of a longitudinal spiral curved surface; and an area of the blades (2) is gradually increased outwards from a central axis of the wind wheel frame.

4. The single-frame impeller of a wind turbine generator set according to claim 1, wherein a conical guide cover (3) is assembled at a front end of the blade adjusting chamber (5).

* * * * *